(12) United States Patent
Burnett et al.

(10) Patent No.: US 7,987,226 B2
(45) Date of Patent: Jul. 26, 2011

(54) INTERNET SMALL COMPUTER SYSTEMS INTERFACE (ISCSI) SOFTWARE TARGET BOOT AND DUMP ROUTING DRIVER

(75) Inventors: Rodney Carlton Burnett, Austin, TX (US); Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 12/262,797

(22) Filed: Oct. 31, 2008

(65) Prior Publication Data

US 2010/0115066 A1    May 6, 2010

(51) Int. Cl.
*G06F 15/16* (2006.01)
(52) U.S. Cl. ........ 709/201; 709/212; 709/213; 709/217; 709/218; 709/250
(58) Field of Classification Search .................. 709/220, 709/226, 201, 212, 213, 217, 218, 250; 713/2
See application file for complete search history.

(56) References Cited

U.S. PATENT DOCUMENTS

| | | | |
|---|---|---|---|
| 6,430,707 B1 | 8/2002 | Matthews et al. | |
| 6,473,857 B1 * | 10/2002 | Panas et al. | 713/2 |
| 6,920,554 B2 | 7/2005 | Rawson, III | |
| 7,062,677 B1 | 6/2006 | Chigurupati | |
| 2002/0147860 A1 | 10/2002 | Tapperson | |
| 2005/0246345 A1 * | 11/2005 | Lent et al. | 707/10 |
| 2006/0218388 A1 * | 9/2006 | Zur et al. | 713/2 |
| 2007/0033281 A1 | 2/2007 | Hwang et al. | |
| 2007/0239944 A1 * | 10/2007 | Rupanagunta et al. | 711/147 |
| 2008/0083037 A1 * | 4/2008 | Kruse et al. | 726/27 |

\* cited by examiner

*Primary Examiner* — Djenane M Bayard
(74) *Attorney, Agent, or Firm* — Dillon & Yudell LLP

(57) ABSTRACT

A method, a system and a computer program product for mapping a client's request to perform boot and/or dump operations to a set of backing files which enable boot and dump operations in a data processing system. A Target Routing Driver (TRD) utility creates multiple Network Installation Management (NIM) objects and/or Network Dump Management (NDM) objects including (1) an Internet Small Computer Systems Interface (iSCSI) boot station and (2) an iSCSI dump collection point. The boot station exports a single iSCSI software (S/W) target from which a set of Diskless Servers obtain a boot image which enables a boot operation. The dump collection point exports a single iSCSI S/W target which is used by Diskless Servers as a dump location. The TRD utility uses the single target (exported from a particular NDM object type) to utilize the minimal resource allocation which allows listening on a single connection. The TRD utility enables block range mapping of the request to the backing files on a remote/separate storage device for the associated Diskless Server.

15 Claims, 4 Drawing Sheets

INTERNET SMALL COMPUTER SYSTEMS INTERFACE (ISCSI) SOFTWARE TARGET BOOT AND DUMP ROUTING DRIVER

BACKGROUND

1. Technical Field

The present invention generally relates to data processing systems and in particular to routing of system files in data processing systems

2. Description of the Related Art

A Diskless Server or other client server that runs as a diskless model may be configured as a single application, special-purpose computer, which usually has a very limited storage capability and a "trimmed-down" operating system. A Thin server is an example of a Diskless server that uses Network File System (NFS) mounted file systems. A Thin Server/Diskless Server contains just enough hardware and software to support a particular function that users can share in a network, such as access to files on a storage device, access to CD-ROM drives, printing, or Internet access. A Thin Server/Diskless Server may be quickly added to a network and costs less than providing the same service through a more general-purpose computer server.

Usually, a Diskless Server contains an abbreviated version of one or more operating systems, such as a Windows Operating System, or UNIX, and necessary network protocols, such as Transmission Control Protocol/Internet Protocol (TCP/IP). Typically, a Diskless Server includes software to support the Hypertext Transfer Protocol. Consequently, the Diskless Server may be configured, administered, and used through a Web browser user interface. The hardware processor may utilize reduced instruction set computer (RISC) processing.

One limitation with current implementations of Diskless Servers is that there is no dump capability. There is no dump capability because traditional dump methods rely on a local device such as a hard disk or tape drive to receive the dump. Because the Diskless Server has no such local device, capturing a dump is not currently possible.

A Diskless Server typically uses an Ethernet adapter to communicate with the server serving the file systems. Most operating systems currently support the client side iSCSI protocol over Ethernet. The iSCSI protocol is a network protocol that allows clients to send SCSI commands to SCSI storage devices. Consequently, the client is given the illusion of a locally attached disk. The iSCSI protocol runs over existing TCP/IP based network infrastructures rather than requiring special purpose wiring. An iSCSI Initiator is a client seeking access to an iSCSI Target (e.g., a storage device). The iSCSI target exports local storage to be accessed by iSCSI initiators using the iSCSI protocol over a network. An iSCSI software (S/W) Target is a software target driver that enables a machine to act as one iSCSI target device or as several iSCSI target devices. Each target device has an iSCSI Qualified Name and a set of logical unit numbers (LUNs) that are available to initiators that connect to the virtual iSCSI target. The existing iSCSI device model requires that all space be allocated in advance even if that space is never used.

SUMMARY OF ILLUSTRATIVE EMBODIMENTS

Disclosed are a method, a system and a computer program product for mapping a client's request to perform boot and/or dump operations to a set of backing files which enable boot and dump operations in a data processing system. A Target Routing Driver (TRD) utility creates multiple Network Installation Management (NIM) objects and/or Network Dump Management (NDM) objects including (1) an Internet Small Computer Systems Interface (iSCSI) boot station and (2) an iSCSI dump collection point. The boot station exports a single iSCSI software (S/W) target from which a set of Diskless Servers obtain a boot image which enables a boot operation. The dump collection point exports a single iSCSI S/W target which is used by Diskless Servers as a dump location. The TRD utility uses the single target (exported from a particular NDM object type) to utilize the minimal resource allocation which allows listening on a single connection. The TRD utility enables block range mapping of the request to the backing files on a remote/separate storage device for the associated Diskless Server.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
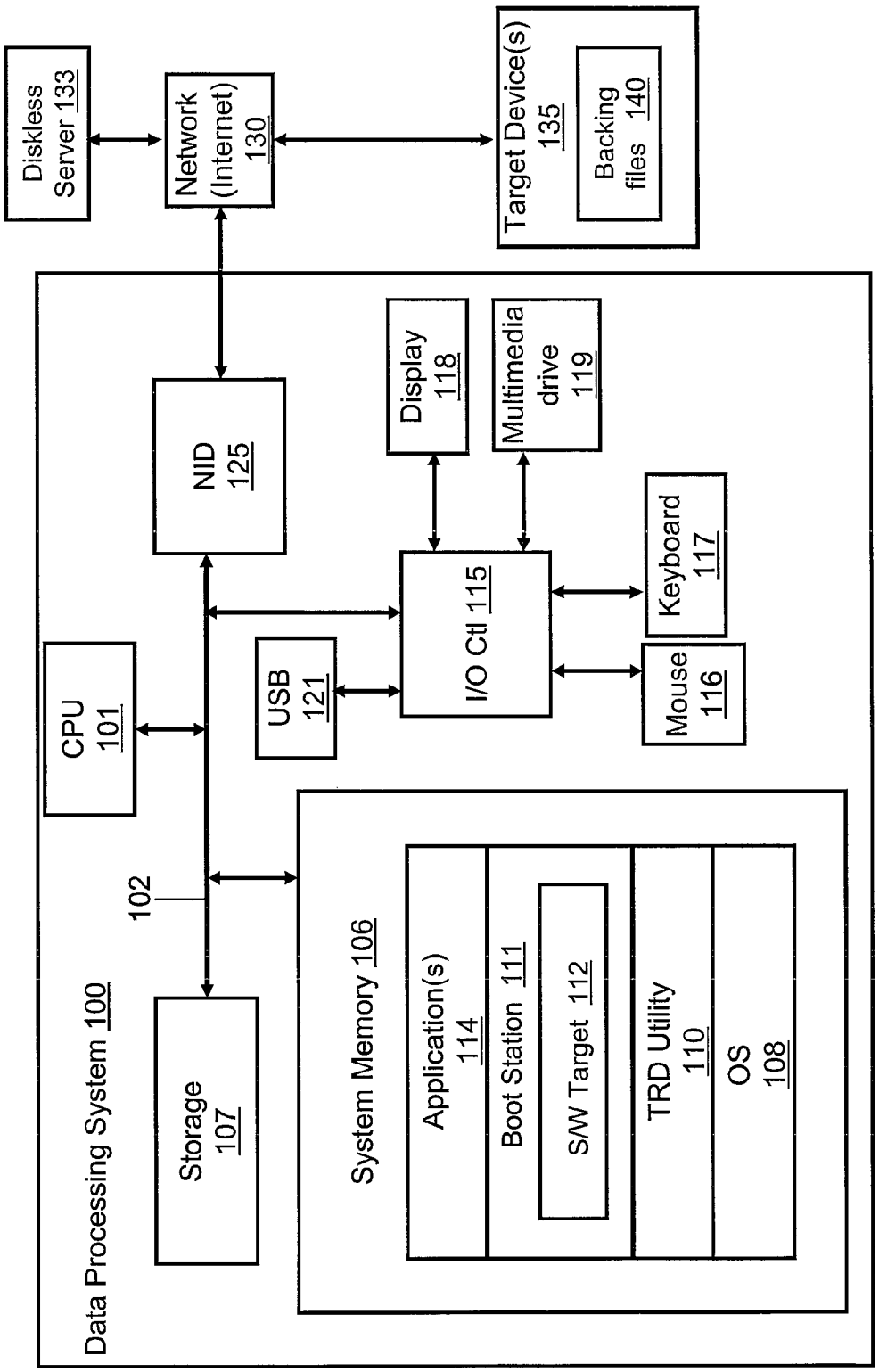
FIG. 1 provides a block diagram representation of a data processing system within which the invention is practiced, according to one embodiment of the invention.

The illustrative embodiments provide a method, a system and a computer program product for mapping a client's request to perform boot and/or dump operations to a set of backing files which enable boot and dump operations in a data processing system. A Target Routing Driver (TRD) utility creates multiple Network Installation Management (NIM) objects and/or Network Dump Management (NDM) objects including (1) an Internet Small Computer Systems Interface (iSCSI) boot station and (2) an iSCSI dump collection point. The boot station exports a single iSCSI software (S/W) target from which a set of Diskless Servers obtain a boot image which enables a boot operation. The dump collection point exports a single iSCSI S/W target which is used by Diskless Servers as a dump location. The TRD utility uses the single target (exported from a particular NDM object type) to utilize the minimal resource allocation which allows listening on a single connection. The TRD utility enables block range mapping of the request to the backing files on a remote/separate storage device for the associated Diskless Server.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which the term is utilized.

With reference now to the figures, and beginning with FIG. 1, there is depicted a block diagram representation of an example data processing system (DPS), as utilized within one embodiment. DPS 100 may be configured as a Network Dump Management (NDM) server and interchangeably referred to as NDM server 100. NDM server 100 provides a central point of management for installing and maintaining Advanced Interactive Executive (AIX) images for other data processing systems. NDM server 100 also facilitates the installation of the AIX image instances from either the same master, from different images, from installation media or other locations. Additionally, NDM server 100 can group AIX image instances and install multiple instances at the same time across the network or via Virtual Ethernet facilities.

As illustrated, NDM server 100 comprises at least one processor or central processing units (CPUs) connected to system memory 106 via system interconnect/bus 102. In particular, CPU 101 is illustrated. Also connected to system bus 102 is Input/output (I/O) controller 115, which provides connectivity and control for input devices, of which pointing device (or mouse) 116 and keyboard 117 are illustrated. I/O controller 120 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. NDM server 100 also comprises storage (device) 107, within/from which data/instructions/code may also be stored/retrieved.

NDM server 100 is also illustrated with a network interface device (NID) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 125 may be configured to operate via wired/or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more client/client-servers 133 and one or more target devices 135 which may also provide data/instructions/code for execution on DPS 100, in one embodiment. Target device 135 includes backing files 140.

In addition to the above described hardware components of DPS 100, various features of the invention are completed/supported via software (or firmware) code or logic stored within memory 106 or other storage (e.g., storage 107) and executed by CPU1 101. Thus, for example, illustrated within memory 106 are a number of software/firmware/logic components, including operating system (OS) 108 (e.g., AIX, Microsoft Windows®, a trademark of Microsoft Corp, or GNU®/Linux®, registered trademarks of the Free Software Foundation and The Linux Mark Institute), applications 114, one or more NIM objects including iSCSI Boot Station 111 and target routing driver (TRD) utility 110 (which executes on CPU 101). Illustrated within iSCSI Boot Station 111 is iSCSI S/W Target 112 which allows a client (e.g., Diskless server 133) to access storage/target devices 135 over a network. In actual implementation, TRD utility 110 may be combined with or incorporated within iSCSI Boot Station 111 to provide a single executable component, collectively providing the various functions of each individual software component when the corresponding combined code is executed by the CPU 101. For simplicity, TRD utility 110 is illustrated and described as a stand alone or separate software/firmware component, which provides specific functions, as described below.

In one embodiment, servers 133 includes a software deploying server, and NDM server 100 communicates with the software deploying server (133) via network (e.g., Internet 130) using network interface device 125. Then, the TRD utility 110 may be deployed from/on the network, via software deploying server 133. With this configuration, software deploying server performs all of the functions associated with the execution of TRD utility 110. Accordingly, NDM server 100 is not required to utilize internal computing resources of NDM server 100 to execute TRD utility 110.

CPU 101 executes TRD utility 110 as well as OS 108. Certain functions supported and/or implemented by TRD utility 110 generate processing logic utilized by processor and/or device hardware to complete the implementation of that function. For simplicity of the description, the collective body of code that enables these various features is referred to herein as TRD utility 110. Among the software code/instructions/logic provided by TRD utility 110, and which are specific to the invention, are: (a) code/logic for initiating the creation of NIM and/or NDM objects; (b) code/logic for initiating the export of an iSCSI S/W target to an initiator/Diskless Server; (c) code/logic for mapping an incoming request, based on IP address or initiator name, to a set of backing files to enable boot and/or dump operations; and (d) code/logic for allowing a group of client servers or Diskless Servers to utilize a single exported target to access a same target device (e.g., target device 135). According to the illustrative embodiment, when CPU 101 executes TRD utility 110, DPS 100 initiates a series of functional processes that enable the above functional features as well as additional features/functionality. These features/functionality are described in greater detail below within the description of FIGS. 2-4.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
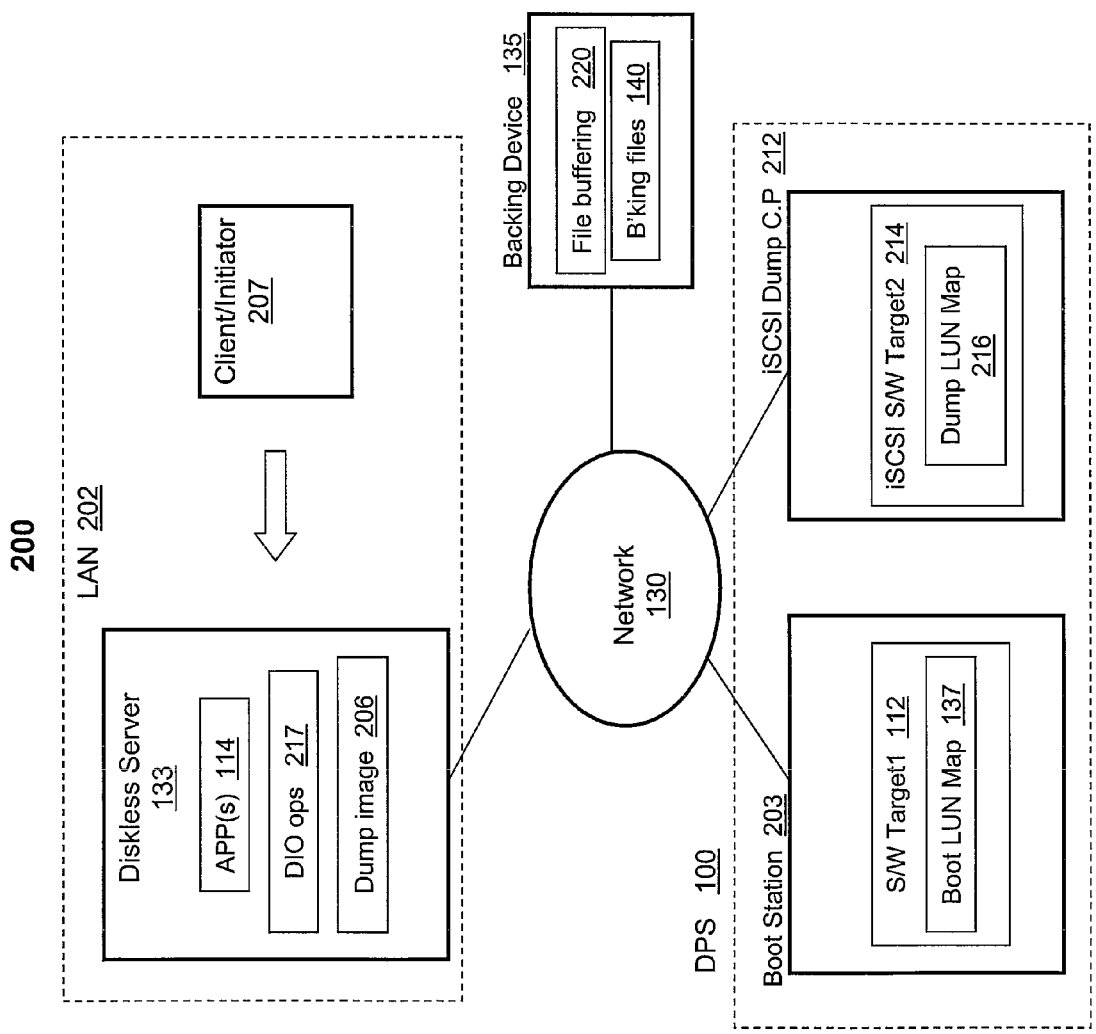
FIG. 2 illustrates a data network in which a Diskless server connects to a pair of NDM Network Dump Management (NDM) servers, in accordance with one embodiment of the invention.

With reference now to FIG. 2, a network in which a client server/Diskless Server connects to an NDM Server is illustrated, according to one embodiment of the invention. Network 200 comprises LAN 202, within which client/initiator 207 initiates a request at Diskless Server 133.

In one embodiment, the (initiator) functions of client/initiator 207 are contained within Diskless Server 133. In another embodiment, client/initiator 207 and Diskless Server 133 are separate entities.

Diskless Server 133 connects to NDM server/DPS 100 via Network 130. Network 130 may be configured as network employing one or more protocols including: (a) the Internet Small Computer Systems Interface (iSCSI) protocol; (b) the SCSI protocol; (c) the Fiber Channel Protocol (FCP); and (d) some other non-Internet based protocol. Diskless Server 133 comprises application 114 and Dump Image 206. In Network 200, NDM server 100 collectively represents (by functionality) an iSCSI boot station (illustrated by boot station 203) and an iSCSI dump collection point (illustrated as dump collection point 212). Illustrated within boot station 203 is iSCSI S/W Target1 112. ISCSI S/W Target1 112 further comprises Boot LUN Map 137. Illustrated within dump collection point 212 is iSCSI S/W Target2 214. As illustrated, iSCSI S/W Target2 214 further comprises Dump LUN Map 216.

In Network 200, TRD utility 110 initiates the creation of the following two data management object types: (1) an iSCSI boot station; and (2) an iSCSI dump collection point. iSCSI boot station 203 is an NDM server that exports a iSCSI software (S/W) Target (Target1 112) from which client servers (e.g., Diskless server 133) within a dump environment obtain boot image within backing files 140. In one embodiment, the data management objects may be structured as one or more of: (a) a Network Installation Management (NIM) object; and (b) a Network Dump Management (NDM) object. In one embodiment, TRD utility 110 may enable Diskless Server 133 to access local stand alone machines (e.g., target storage devices) by utilizing an SCSI or Fiber Channel within LAN 202. In particular, S/W Target1 112 may be backed by an AIX network boot image. The iSCSI dump collection point 212 is on a NDM server that exports an iSCSI S/W target (Target2 214) which is used by client servers (e.g., Diskless Server 133) as a dump location. Target2 214 is backed by storage device/target device 135. Space is allocated from storage device 135 during dump capture to house dump image 206.

In one embodiment, the functionality of the boot station 203 and iSCSI dump collection point 212 may be collectively integrated into a single NDM server device (e.g., NDM server 100). Furthermore, the single NDM server device may export a single exported software target which enables a group of client servers (e.g., Diskless Server(s) 133) to utilize the single exported software target to access a same target device to obtain one or more of: (a) a boot image file; and (b) a path to a dump location which stores dump images.

TRD utility 110 uses the single exported S/W Target to enable an allocation of a minimal set of resources for listening on a single connection. TRD utility 110 allows multiple initiators to use the single exported Target (e.g., Target1 112) to access the same target LUN (illustrated in FIG. 3). TRD utility 110 maps an incoming request based on IP address or initiator name (e.g., of initiator 207) to a set of backing files 140 for the device/Diskless Server 133. In one embodiment, TRD utility 110 maps an incoming request to a set of backing files 140 which are stored within one or more backing devices 135. In another embodiment, TRD utility 110 maps the incoming request directly to one or more backing devices 135. TRD utility 110 enables block range mapping (illustrated within FIG. 3) so that a boot image within backing files 140 for Diskless server 133 may be composed of one or more files within backing device 135. Dump image 206 may be mapped to another set of files within backing device 135. In one embodiment, read operations may be backed from (i.e., supported by) one file while write operations may be backed to a different file (i.e., one block range for reading and another for writing).

In order for one or more Diskless Servers to read a boot image within backing files 140, TRD utility 110 utilizes file system buffering resources and functions (illustrated by file buffering 220) on backing device 135 to perform a read of a cached boot image in backing device 135 by multiple Diskless servers. TRD utility 110 marks the boot image files as read only. TRD utility 110 enables a client to initiate a dump via a write operation by performing direct input output (DIO) operations 217. TRD utility 110 uses a second set of files for write operations to allow write operations to bypass file system buffering 220.

Dump image files are not shared between (Diskless Server) endpoints. Thus, file system buffering is not needed for operations related to dump image files. TRD utility 110 marks the dump image files as write only. Each time Diskless Server 133 initiates a dump, the dump is captured without overwriting the previous dump. TRD utility 110 may prevent the overwrite of previous dump file by simply renaming the previous dump file before performing write operations related to the current dump. The space used to house dump image 206 is allocated as the dump progresses to provide efficient use of space in backing device 135. When both sets of files (i.e., boot files and dump files) are located within the same target device (e.g., backing device 135), TRD utility 110 uses a dynamic allocation of space for write operations, since it is generally not known if backing files are to be read or written upon (Diskless server's) accessing of the target LUN. In one embodiment, only after the relevant backing file is opened TRD utility 110 receives indication that a read or write operation is requested. TRD utility 110 opens the backing file after (1) an I/O request is received and (2) the appropriate backing file is found in the LUN map (e.g., LUN Map 137).

In one embodiment, TRD utility 110 may execute boot and dump operations from the same backing device 135. In another embodiment, TRD utility 110 may allow a client to boot via AIX image instances obtained from either the same master, from different images, from installation media or other locations. TRD utility 110 may allow a client to dump via iSCSI S/W target2 214 utilized exclusively as a dump collection point. In yet another embodiment, TRD utility 110 may assign one target/backing device to one particular client. Furthermore, TRD utility 110 may provide multiple backing files per target/backing device.

Figure 3:
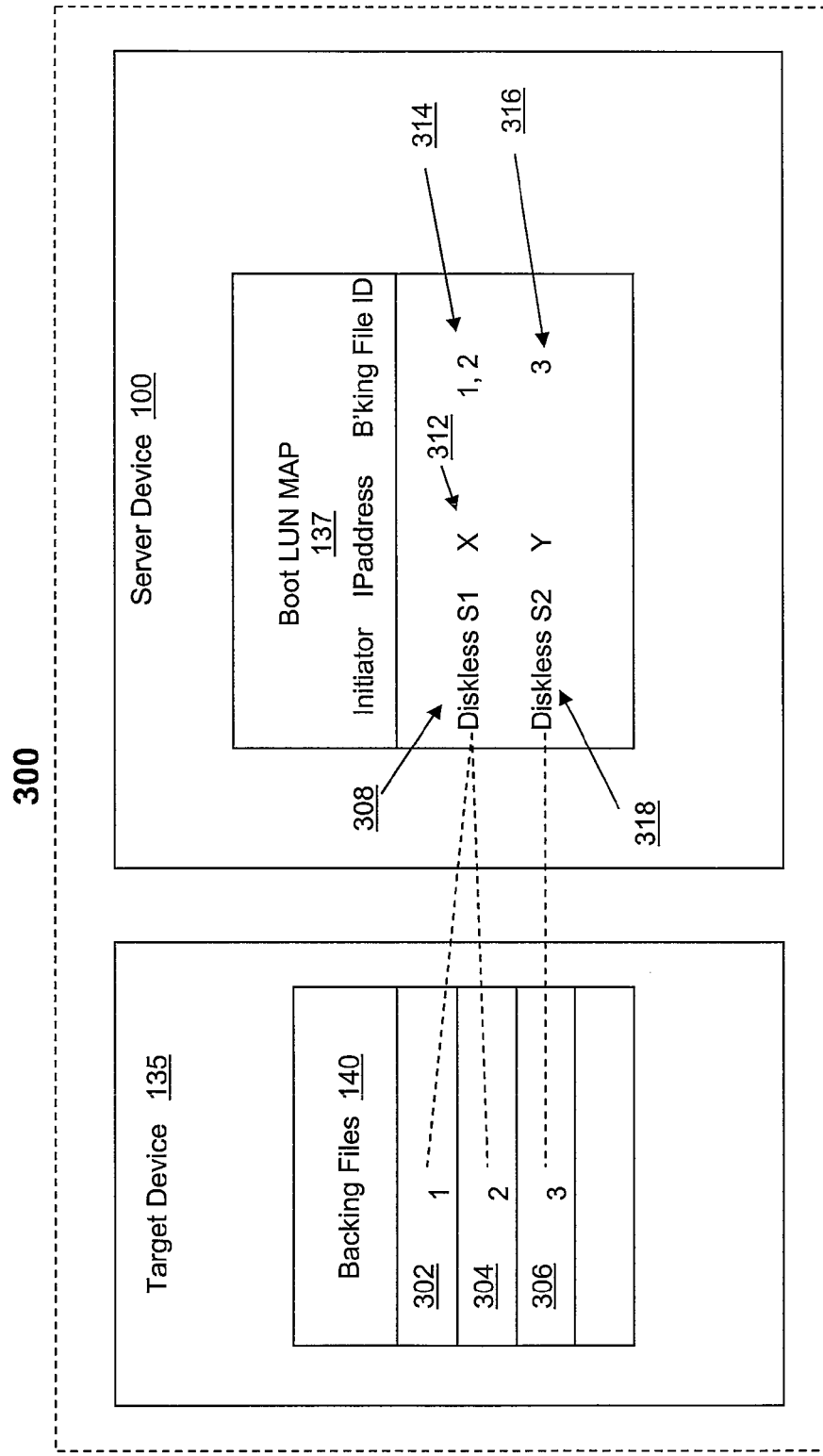
FIG. 3 illustrates the mapping of backing files to Diskless server devices, according to one embodiment of the invention.

FIG. 3 illustrates the mapping of backing files to Diskless Server devices, according to one embodiment of the invention. Network 300 comprises NDM Server 100 and target device 135. Target Device 100 comprises a collection of backing files (illustrated as backing files 140). NDM Server 100 comprises Boot LUN Map 137 to enable mapping of requests to virtualized backing file spaces. In NDM Server 100, TRD utility 110 supports the mapping of incoming device I/O to a number of backing files 140. Mapping (of device to backing files) is executed via block range and facilitated by initiator parameters (e.g., IP address or initiator name). For example, "Diskless Served" 308 (also identified via IP address X 312) is mapped to backing files 1 and 2 (illustrated by block range 1-2 314). "Diskless Server2" 318 is mapped to backing file 3 (illustrated by block range3 316). The boot path is backed by one set of files and the dump path (not explicitly shown) is backed by a second set of files. The block range corresponding to the boot path is marked as read only while the dump path is marked as write only. Thus, upon initiation of a boot or dump event, TRD utility 110 uses the IP Address or initiator name of the client (e.g. Diskless Server 133) associated with the incoming request to map the request to a specified set of backing files. This mapping capability allows a single exported iSCSI target device (e.g., backing device 135) to be virtualized into many backing file spaces, including file space1 302, file space2 304 and file space3 306, for example, that are keyed by the IP address of the iSCSI initiator. This mapping capability enables simplified administration for establishing a scalable iSCSI based dump capture environment.

Figure 4:
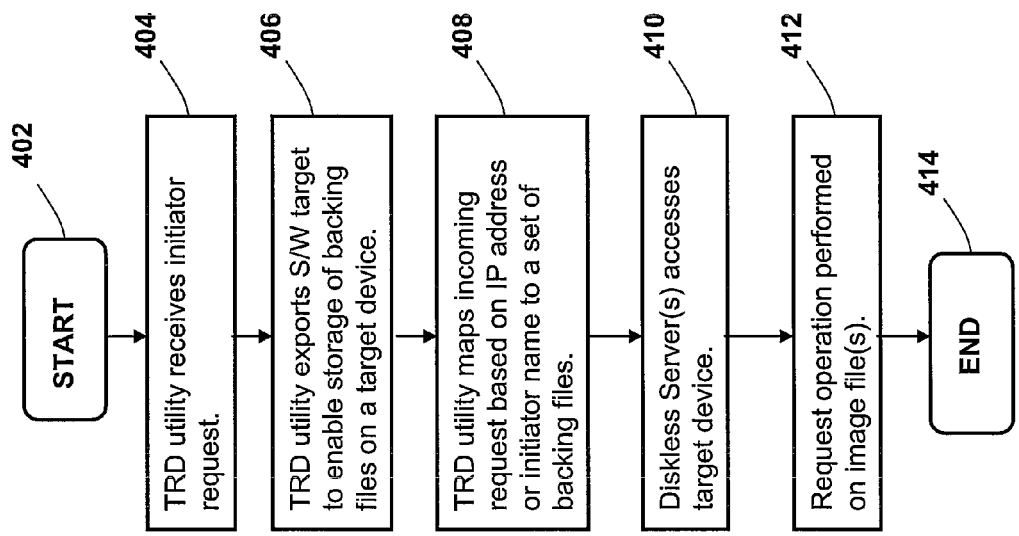
FIG. 4 is a flow chart illustrating the process of mapping a request from a Diskless server to a set of backing files, according to one embodiment of the invention.

FIG. 4 is a flow chart illustrating a method by which the above processes of the illustrative embodiments are completed. Although the method illustrated in FIG. 4 may be described with reference to components shown in FIGS. 1-3, it should be understood that this is merely for convenience and alternative components and/or configurations thereof can be employed when implementing the various methods. Key portions of the methods may be completed by TRD utility 110 executing on processor 101 within NDM server 100 (FIG. 1) and controlling specific operations of/on NDM server 100, and the methods are thus described from the perspective of either/both TRD utility 110 and NDM server 100.

The process of FIG. 4 begins at initiator block 402 and proceeds to block 404, at which TRD utility 110 receives an initiator request. The request includes an IP address or initiator name of the requesting client. At block 406, TRD utility 110 exports an S/W target to enable storage of backing files on a target device. At block 408, TRD utility 110 maps an incoming request, based on IP address or initiator name (e.g., of Diskless Server(s) 133), to a set of backing files 140 for the device/Diskless Server 133. TRD utility 110 enables block range mapping (illustrated within FIG. 3) so that boot image 135 for Diskless Server 133 may be composed of one or more files and dump image 206 may be mapped to another set of files within backing device 135. In one embodiment, read operations may be backed from one file while write operations may be backed to a different file (i.e., one block range for reading and another for writing). Returning to FIG. 4, at block 410, TRD utility 110 enables Diskless Server(s) 133 to access a target device identified by a target logical unit number (LUN). A target LUN uniquely identifies a device that exists on a target, usually a tape or disk drive. A request operation is performed on the image file(s), as shown at block 412. For example, Diskless Server 133 may boot by reading a set of boot image files. In one embodiment, when both sets of files (i.e., boot files and dump files) are located within the same target device (e.g., backing device 135), TRD utility 110 uses a dynamic allocation of space for write operations, since it is generally not known if backing files are to be read or written upon (Diskless server's) accessing of the target LUN.

In one embodiment, only after the relevant backing file is opened TRD utility 110 receives indication that a read or write operation is requested. The process ends at block 414.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system having a server device which is connected to a target network device, a method comprising:
creating, on the server device, a group of data management objects including: (a) a boot station, wherein said boot station operates as a boot server; and (b) a dump collection point, wherein said dump collection point operates as a dump server;
generating, using the server device, software (S/W) targets using: (a) the boot server; and (b) the dump server;
providing backing storage of a plurality of backing files on the target network device by using the software (S/W) targets exported from the server device;
assigning, using the server device, a set of backing files that are included in the plurality of backing files to block ranges of the target network device;
mapping, using the server device, a request from a client to the set of backing files according to an identification of the client based on one or more of: (a) an IP address; and (b) identification of an associated initiator;
enabling the client to access the target network device in order to access the set of backing files, wherein said set of backing files contain one or more of: (a) a boot image file; and (b) a file for storing dump images; and
identifying via block range mapping (a) a boot image within a first set of files for the client and (b) a second set of files for collection of a dump image from the client, wherein said first set of files provides a first block range for read requests and said second set of files provides a second block range for write requests, and wherein said first and second set of files are included in said set of backing files.

2. The method of claim 1, wherein said executing further comprises:
applying file system buffering resources and functions on the server device to a read of a boot image by multiple clients;
wherein said clients collectively initiate a boot process within a preset maximum interval;
wherein said clients are provided with access to a cached boot image;
designating a first set of boot image files as read only;
performing a file dump via a write operation using execution of Direct Input/Output (DIO) operations to other files in order to bypass a file system cache; and
designating a group of dump image files as write only.

3. The method of claim 1, further comprising:
preventing an overwrite of a previous dump file by an operation to rename said previous dump file before execution of write operations related to a current file dump;
allocating space used to store a dump image during execution of the file dump ; and
opening the set of backing files following (a) receipt of an I/O request and (b) identification of a group of backing files for the requesting client in a routing map.

4. The method of claim 1, further comprising:
configuring the boot server and dump server as a single composite server or as separate servers;
exporting one or more software (S/W) targets to enable a data processor to operate as the target network device;
wherein the one or more target devices is represented by the target network device;
wherein said client is one or more of: (a) a Diskless server; (b) a server configured as a diskless model; and (c) a specialized server;
configuring the server device as one or more of: (a) a Network Installation Management (NIM) server; (b) a Network Dump Management (NDM) server;
allocating a minimal set of resources associated with file listening on a single connection;
allowing boot operations and dump operations to be performed by one or more of: (a) a single client; and (b) multiple clients in which a first subset of clients performs boot operations and a second subset of clients performs dump operations;
enabling a client to execute one or more of: (a) a boot via an iSCSI boot target; and (b) a dump to an iSCSI target utilized as a dump collection point;
providing one or more of: (a) an exclusive assignment of a target LUN to a single endpoint; and (b) assignment of a target LUN to multiple endpoints; and
providing multiple sets of backing files per target LUN.

5. The method of claim 1, further comprising:
providing backing storage via multiple backing files on the exported network device by using one or more of: (a) iSCSI based S/W targets; and (b) non iSCSI based S/W targets;
wherein said backing files are not required to be fully allocated and wherein writing to an unallocated block within a block range of said backing files may allocate said unallocated block;
mapping clients to one or more of: (a) backing files; and (b) backing devices;
designating backing files as one or more of: (a) read only files; (b) write only files; and (c) both read and write files;
allowing the client to access local stand alone storage devices by utilizing one or more of: (a) an ISCSI protocol; (b) an SCSI protocol; and (c) a Fiber Channel Protocol (FCP); and
enabling the client to utilize exported software targets to access a same target LUN.

6. A data processing system comprising:
one or more processors;
a memory system coupled to the one or more processors;
a network connection to one or more communication devices; and
a utility which when executed on one or more of the processors provides the functions of:
creating a group of data management objects including: (a) a boot station, wherein said boot station operates as a boot server; and (b) a dump collection point, wherein said dump collection point operates as a dump server;
generating software (S/W) targets using: (a) the boot server; and (b) the dump server;
providing backing storage of a plurality of backing files on the target network device by using the software (S/W) targets exported from the data processing system;
assigning a set of backing files that are included in the plurality of backing files to block ranges of the target network device;
mapping a request from a client to the set of backing files according to an identification of the client based on one or more of: (a) an IP address; and (b) identification of an associated initiator;
enabling the client to access the target network device in order to access the set of backing files, wherein said set of backing files contain one or more of: (a) a boot image file; and (b) a file for storing dump images; and
identifying via block range mapping (a) a boot image within a first set of files for the client and (b) a second set of files for collection of a dump image from the client, wherein said first set of files provides a first block range for read requests and said second set of files provides a second block range for write requests, and wherein said first and second set of files are included in said set of backing files.

7. The data processing system of claim 6, wherein said functions for executing further comprises functions for:
applying file system buffering resources and functions on the data processing system to a read of a boot image by multiple clients;
wherein said clients collectively initiate a boot process within a preset maximum interval;
wherein said clients are provided with access to a cached boot image;
designating a first set of boot image files as read only;
performing a file dump via a write operation using execution of Direct Input/Output (DIO) operations to other files in order to bypass a file system cache; and
designating a group of dump image files as write only.

8. The data processing system of claim 6, said utility further comprising functions for:
preventing an overwrite of a previous dump file by an operation to rename said previous dump file before execution of write operations related to a current file dump;
allocating space used to store a dump image during execution of the file dump; and
opening the set of backing files following (a) receipt of an I/O request and (b) identification of a group of backing files for the requesting client in a routing map.

9. The data processing system of claim 6, said utility further comprising functions for:
configuring the boot server and dump server as a single composite server or as separate servers;
exporting one or more software (S/W) targets to enable a data processor to operate as the target network device;
wherein the one or more target devices is represented by the target network device;
wherein said client is represented by one or more of: (a) a Diskless server; (b) a server configured as a diskless model; and (c) a specialized server;
configuring the server device as one or more of: (a) a Network Installation Management (NIM) server; (b) Network Dump Management (NDM) server;
allocating a minimal set of resources associated with file listening on a single connection;
allowing boot operations and dump operations to be performed by one or more of: (a) a single client; and (b) multiple clients in which a first subset of clients performs boot operations and a second subset of clients performs dump operations;
enabling a client to execute one or more of: (a) a boot via an iSCSI boot target; and (b) a dump to an iSCSI target utilized as a dump collection point;
providing one or more of: (a) an exclusive assignment of a target LUN to a single endpoint; and (b) assignment of a target LUN to multiple endpoints; and
providing multiple sets of backing files per target LUN.

10. The data processing system of claim 6, further comprising:
providing backing storage via multiple backing files on the exported network device by using one or more of: (a) iSCSI based S/W targets; and (b) non iSCSI based S/W targets;
wherein said backing files are not required to be fully allocated and writing to an unallocated block within a block range of said backing files may allocate said unallocated block;
mapping clients to one or more of: (a) backing files; and (b) backing devices;
designating backing files as one or more of: (a) read only files; (b) write only files; and (c) both read and write files;
allowing the client to access local stand alone storage devices by utilizing one or more of: (a) an ISCSI protocol; (b) an SCSI protocol; and (c) a Fiber Channel Protocol (FCP); and
enabling the client to utilize exported software targets to access a same target LUN.

11. A computer program product comprising:
a machine readable storage medium; and
program code on said machine readable storage medium that when executed within a data processing system provides the functionality of:
creating a group of data management objects including: (a) a boot station, wherein said boot station operates as a boot server; and (b) a dump collection point, wherein said dump collection point operates as a dump server;
generating software (S/W) targets using: (a) the boot server; and (b) the dump server;
providing backing storage of a plurality of backing files on the target network device by using the software (S/W) targets exported from the server device;
assigning a set of backing files that are included in the plurality of backing files to block ranges of the target network device;
mapping a request from a client to the set of backing files according to an identification of the client based on one or more of: (a) an IP address; and (b) identification of an associated initiator;

enabling the client to access the target network device in order to access the set of backing files, wherein said set of backing files contain one or more of: (a) a boot image file; and (b) a file for storing dump images; and identifying via block range mapping (a) a boot image within a first set of files for the client and (b) a second set of files for collection of a dump image from the client, wherein said first set of files provides a first block range for read requests and said second set of files provides a second block range for write requests, and wherein said first and second set of files are included in said set of backing files.

12. The computer program product of claim 11, further comprises further comprising program code for:

applying file system buffering resources and functions on the data processing system to a read of a boot image by multiple clients;

wherein said clients collectively initiate a boot process within a preset maximum interval;

wherein said clients are provided with access to a cached boot image;

designating a first set of boot image files as read only;

performing a file dump via a write operation using execution of Direct Input/Output (DIO) operations to other files in order to bypass a file system cache; and designating a group of dump image files as write only.

13. The computer program product of claim 11, further comprising program code for:

preventing an overwrite of a previous dump file by an operation to rename said previous dump file before execution of write operations related to a current file dump;

allocating space used to store a dump image during execution of the file dump ; and opening the set of backing files following (a) receipt of an I/O request and (b) identification of a group of backing files for the requesting client in a routing map.

14. The computer program product of claim 11, further comprising program code for:

configuring the boot server and dump server as a single composite server or as separate servers;

exporting one or more software (S/W) targets to enable a data processor to operate as the target network device;

wherein the one or more target devices is represented by the target network device;

wherein said client is represented by one or more of: (a) a Diskless server; (b) a server configured as a diskless model; and (c) a specialized server;

configuring the server device as one or more of: (a) a Network Installation Management (NIM) server; (b) Network Dump Management (NDM) server;

allocating a minimal set of resources associated with file listening on a single connection;

allowing boot operations and dump operations to be performed by one or more of: (a) a single client; and (b) multiple clients in which a first subset of clients performs boot operations and a second subset of clients performs dump operations;

enabling a client to execute one or more of: (a) a boot via an iSCSI boot target; and (b) a dump to an iSCSI target utilized as a dump collection point;

providing one or more of: (a) an exclusive assignment of a target LUN to a single endpoint; and (b) assignment of a target LUN to multiple endpoints; and providing multiple sets of backing files per target LUN.

15. The computer program product of claim 11, further comprising program code for:

providing backing storage via multiple backing files on the exported network device by using one or more of: (a) iSCSI based S/W targets; and (b) non iSCSI based S/W targets;

wherein said backing files are not required to be fully allocated and writing to an unallocated block within a block range of said backing files may allocate said unallocated block;

mapping clients to one or more of: (a) backing files; and (b) backing devices; designating backing files as one or more of: (a) read only files; (b) write only files; and (c) both read and write files;

allowing the client to access local stand alone storage devices by utilizing one or more of: (a) an ISCSI protocol; (b) an SCSI protocol; and (c) a Fiber Channel Protocol (FCP); and enabling the client to utilize exported software targets to access a same target LUN.

* * * * *